LYONS & PHILLIPS.
Grinding Mill.
No. 23,850.
Patented May 3, 1859.
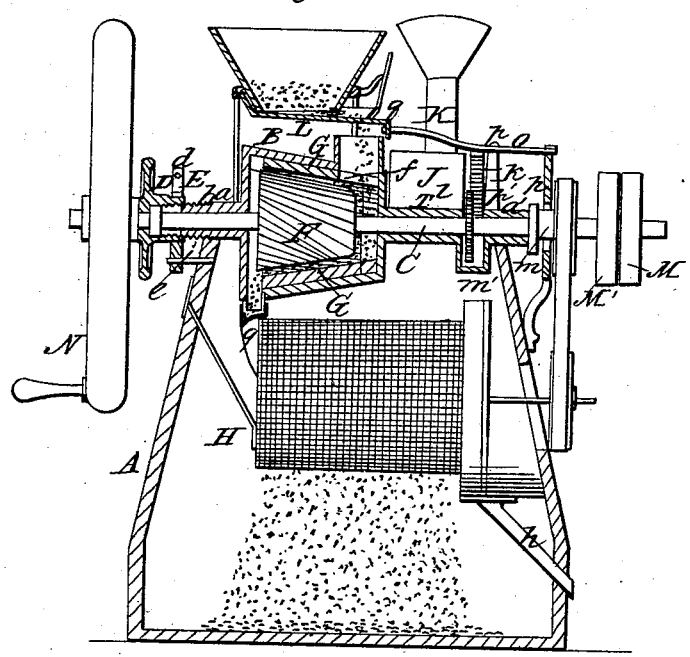
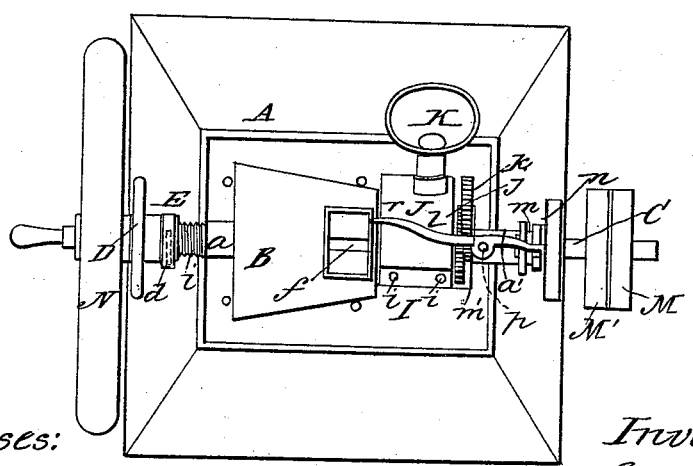

UNITED STATES PATENT OFFICE.

J. C. LYONS, OF AUBURN, AND H. F. PHILLIPS, OF SENECA FALLS, NEW YORK.

GRINDING-MILL.

Specification of Letters Patent No. 23,850, dated May 3, 1859.

*To all whom it may concern:*

Be it known that we, J C. Lyons, of Auburn, in the county of Cayuga and State of New York, and H. F. Phillips, of Seneca Falls, in the county of Seneca and State of New York, have invented a new and Improved Grinding-Mill; and we do hereby declare that the following is a full, clear, and exact description of the same, reference being had to the accompanying drawings, making part of this specification, in which—

Figure 1, represents a vertical longitudinal section of a grinding mill constructed according to our improvements. Fig. 2, is a plan or top view of ditto.

Similar letters of reference in the two figures, indicate corresponding parts.

This invention consists in arranging the grinding cone and the corn cracker of a grinding mill in such relation to each other, that the former can be operated independent from the latter so that when wheat or grain is to be reduced to flour by the action of this cone, the corn cracker can either be taken off altogether or that when the same is not taken off the flour from the grinding shell can not enter into the cracker, and, at the same time, if the cracker is used the speed of the same can be so regulated that it works quick enough for the grinding cone without impeding the longitudinal motion of the cone, which is necessary in order to regulate the fineness of the grinding operation.

To enable others skilled in the art to fully understand, use and construct our invention we will proceed to describe its construction and operation.

A, represents the box or superstructure which supports the grinding apparatus, and in which the flour or meal collects after it has been ground and cleared. This box is constructed in the usual manner of boards, and portable if desired so that the whole grinding apparatus can be moved from place to place. Secured to the top of this box is the casing B which consists of two parts secured together by means of flanges and screws, and secured to the ends of this casing are the bosses $a$, $a'$, which form the bearings for a shaft C, and one of these bosses $a$ is provided with a screw thread $b$ and a handwheel D fits loosely over the shaft, having its hub bored out and screwed so as to screw over the end of the boss $a$, and a collar $c$ is firmly secured on the shaft and turned down so that the hollow part of the hub of the hand wheel D passes freely over the same and that the shaft C receives a longitudinal sliding motion as the hand wheel D is screwed over the boss $a$. In order to secure the hand wheel in its position and to prevent its turning spontaneously a clamp E is placed over the hub of the wheel and this clamp is pressed firmly on the hub by a thumb screw $d$, and the lower part of this clamp slides on a pin $e$ to prevent it from turning.

F is the grinding cone which is rigidly attached to the shaft C and which works in a shell G, which is cast separate from the casing B, so that it can be replaced if it is worn out, and which is secured to the casing by means of screw bolts, and an aperture $f$ is left in its top through which the grain or cracked corn is introduced, and this shell is sufficiently shorter than the casing B, so that room enough is left for the free escape of the reduced grain or corn, and when reduced to the proper fineness the flour is discharged through a tube $g$ to a smutting cylinder H, by the action of which the pure flour or meal is deposited on the bottom of the box A, while the coarser parts and the impurities are discharged through a tube $k$ and deposited on the outside of the box as clearly represented in Fig. 1.

The hopper L is actuated by means of an eccentric $m$, which operates on a forked arm $n$, through which motion is imparted to a lever $o$, which turns on a pivot $p$, in the standard $p'$, and which is connected to the hopper by means of an ear $q$. Close behind that part of the casing B, which contains the grinding cone F, a platform I is formed which supports a shell J, which incloses a corn cracker, and which is secured to the platform I by means of screws $i$. This shell is provided with a spout or funnel K, through which corn is introduced to the corn cracker and it (the shell) forms the bearings for the shaft $j$ of the cracker, and motion is imparted to this shaft by means of gear wheels $k$ and $l$, the wheel $k$ being secured to the end of the shaft $j$, and the wheel $l$ being rigidly attached to the axle C, and this latter wheel works in a recess $m'$ which is formed by the casing B and which is wide enough so that the required longitudinal motion can be given to the shaft C without obstruction, and the face of the wheel $k$ is considerably wider than the face of the wheel $l$, so that the connection of these is not interrupted when the shaft C is moved in a longitudinal direction. And the proportion of the two wheels $l$ and $k$ is such that the corn cracker is rotated considerably faster than the grinding cone, for it is found with mills of the ordinary construction, where the corn cracker and the grinding cone revolve with the same velocity, that the former don't work quick enough to keep up a sufficient supply to the latter, but with our arrangement the speed is so adjusted that the work done by the cracker is in the proper proportion to the supply needed by the cone. The shell J communicates with the grinding shell $g'$ by means of a short tube $r$, which brings the cracked corn on the small end of the cone F. Motion is imparted to the shaft C by means of a pulley M, which is secured to one end of the shaft together with the loose pulley M' in the usual manner, and the motion of the machinery is regulated by the fly wheel N, which is secured on the opposite end of the shaft C and which serves to counterbalance the weight of the pulleys M M' and of the other parts attached to that side of the shaft.

The operation is as follows: When corn is to be reduced into meal, the corn is brought unto the corn cracker through the funnel K, and after it is cracked, it passes into the grinding shell G where it is reduced to the required fineness by the action of the cone F, and the position of this cone is regulated by the hand wheel D without interrupting the operation of the cracker or of the cone, and the meal from the shell G cannot pass into the shell J, so that the cracker is not clogged up or its motion interrupted, and after the cone F has done its work, the meal passes into the smutting cylinder H, as above described. If the mill is to be used for grinding wheat or other kind of grain, the grain is placed into the hopper box L, from whence it passes unto the grinding cone F through the aperture $f$ in the top of the shell G and it is reduced to flour without coming in contact with, or being able to pass to the corn cracker, and as the latter is not needed for this operation it may be removed altogether and some other device such as a corn sheller may then be put in its place and driven by the wheel $l$ while the grinding of the grain is going on.

What we claim as new, and desire to secure by Letters Patent is:

The within described arrangement and combination of the grinding cone F, and the corn cracker J when the former is arranged on a shaft C, which receives a longitudinal motion by means of a hand wheel D and, from which, motion is conveyed to the corn cracker by means of wheels $k$ and $l$, substantially in the manner and for the purpose herein specified.

JOS. C. LYONS.
H. F. PHILLIPS.

Witnesses:
G. O. RATHBUN,
ABEL DEVON.